United States Patent
Lopatin et al.

(10) Patent No.: US 11,846,555 B2
(45) Date of Patent: *Dec. 19, 2023

(54) PRESSURE GAUGE COMPRISING A DEVICE FOR DEFLECTING AN ISOLATION DIAPHRAGM

(71) Applicant: Endress+Hauser SE+Co. KG, Maulburg (DE)

(72) Inventors: Sergey Lopatin, Lörrach (DE); Igor Getman, Lörrach (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 197 days.

This patent is subject to a terminal disclaimer.

(21) Appl. No.: 17/415,198

(22) PCT Filed: Nov. 21, 2019

(86) PCT No.: PCT/EP2019/082029
§ 371 (c)(1),
(2) Date: Jun. 17, 2021

(87) PCT Pub. No.: WO2020/126278
PCT Pub. Date: Jun. 25, 2020

(65) Prior Publication Data
US 2022/0065725 A1    Mar. 3, 2022

(30) Foreign Application Priority Data
Dec. 20, 2018   (DE) ............ 10 2018 133 053.7

(51) Int. Cl.
| | |
|---|---|
| *G01L 19/00* | (2006.01) |
| *G01L 19/06* | (2006.01) |
| *G01L 9/00* | (2006.01) |
| *G01L 9/14* | (2006.01) |
| *G01L 27/00* | (2006.01) |

(52) U.S. Cl.
CPC ......... *G01L 19/0046* (2013.01); *G01L 9/007* (2013.01); *G01L 9/14* (2013.01); *G01L 19/0672* (2013.01); *G01L 27/007* (2013.01)

(58) Field of Classification Search
CPC . G01L 19/147; G01L 9/0072; G01L 19/0645; G01L 19/0084; G01L 13/025;
(Continued)

(56) References Cited

U.S. PATENT DOCUMENTS

| | | |
|---|---|---|
| 3,492,872 A | 2/1970 | Caspar et al. |
| 4,687,927 A | 8/1987 | Iwamoto et al. |

(Continued)

FOREIGN PATENT DOCUMENTS

| | | |
|---|---|---|
| AT | 557275 T | 5/2012 |
| CN | 108955988 A | 12/2018 |

(Continued)

*Primary Examiner* — Andre J Allen
(74) *Attorney, Agent, or Firm* — Kelly J. Smith; Endress+Hauser (USA) Holding, Inc.

(57) ABSTRACT

Disclosed is a pressure gauge comprising a pressure sensor and a pressure transmitter connected upstream of the pressure sensor and having an isolation diaphragm enclosing a pressure receiving chamber. A hydraulic pressure transmission path is connected to the pressure receiving chamber and is filled with a pressure transmitting fluid that transmits the pressure acting on the outer side of the isolation diaphragm to the pressure sensor The pressure gauge allows functional impairments of the pressure gauge to be detected early without having to change the pressure acting on the outer side of the isolation diaphragm. The pressure transmitter comprises an electronically activatable deflection device which is designed in such a way that, when activated, it exerts a constant force deflecting the isolation diaphragm, on the isolation diaphragm, or on an element connected to the isolation diaphragm.

18 Claims, 4 Drawing Sheets

(58) Field of Classification Search
CPC ............ G01L 19/0007; G01L 9/0042; G01L 19/0038; G01L 9/0073; G01L 9/0075; G01L 9/0054; G01L 9/0055; G01L 19/04; G01L 7/00; G01L 7/04; G01L 19/148; G01L 19/143; G01L 19/14; G01L 17/00; G01L 7/18; G01L 15/00; G01L 19/0092; G01L 9/0051; G01L 7/041; G01L 9/065; G01L 9/12; G01L 19/0618; G01L 9/0052; G01L 7/16; G01L 9/125; G01L 19/0609; G01L 9/007; G01L 19/003; G01L 19/0627; G01L 9/0022; G01L 19/0046; G01L 7/084; G01L 9/06; G01L 19/0636; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 23/18; G01L 23/10; G01L 19/0672; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 9/16; G01L 11/00; G01L 27/007; G01L 27/002; G01L 9/0026; G01L 19/00; G01L 9/0089; G01L 9/045; G01L 9/14; G01L 11/025; G01L 1/2281; G01L 11/008; G01L 19/0654; G01L 7/22; G01L 9/0047; G01L 13/026; G01L 9/0076; G01L 9/0025; G01L 9/0035; G01L 13/00; G01L 19/0061; G01L 9/0005; G01L 9/10; G01L 9/0019; G01L 9/08; G01L 11/006; G01L 21/00; G01L 7/08; G01L 9/04; G01L 9/0041; G01L 9/0008; G01L 11/004; G01L 9/0057; G01L 19/086; G01L 19/083; G01L 1/18; G01L 19/069; G01L 19/10; G01L 19/16; G01L 13/023; G01L 7/048; G01L 9/0016; G01L 9/0027; G01L 9/0086; G01L 9/00; G01L 9/0079; G01L 11/04; G01L 9/0048; G01L 9/0091; G01L 19/06; G01L 23/24; G01L 7/182; G01L 11/002; G01L 19/0663; G01L 7/166; G01L 1/20; G01L 23/22; G01L 27/00; G01L 9/0036; G01L 1/02; G01L 9/0061; G01L 9/0039; G01L 23/125; G01L 9/0013; G01L 9/0092; G01L 21/04; G01L 7/104; G01L 9/0045; G01L 19/145; G01L 9/0033; G01L 9/0083; G01L 9/0098; G01L 1/142; G01L 7/24; G01L 1/2293; G01L 9/0029; G01L 9/02; G01L 21/22; G01L 7/022; G01L 9/0064; G01L 23/08; G01L 23/16; G01L 5/14; G01L 7/088; G01L 7/163; G01L 9/0007; G01L 1/205; G01L 23/222; G01L 9/0085; G01L 1/16; G01L 1/2212; G01L 1/2287; G01L 13/06; G01L 9/0004; G01L 21/14; G01L 23/02; G01L 9/003; G01L 9/025; G01L 9/085; G01L 1/14; G01L 1/148; G01L 9/0058; G01L 9/105; G01L 7/061; G01L 9/002; G01L 7/02; G01L 13/028; G01L 1/2231; G01L 23/28; G01L 9/0095; G01L 1/162; G01L 7/12; G01L 9/0032; G01L 9/0038; G01L 19/0076; G01L 7/024; G01L 21/10; G01L 1/246; G01L 19/149; G01L 7/086; G01L 1/005; G01L 7/06; G01L 7/102; G01L 1/2206; G01L 13/021; G01L 27/02; G01L 5/228; G01L 1/2262; G01L 23/00; G01L 9/0094; G01L 1/24; G01L 9/0082; G01L 1/125; G01L 1/26; G01L 11/06; G01L 9/0097; G01L 1/2268; G01L 21/30; G01L 21/34; G01L 23/221; G01L 7/20; G01L 19/144; G01L 23/26; G01L 7/068; G01L 1/225; G01L 23/32; G01L 7/14; G01L 7/187; G01L 1/144; G01L 1/165; G01L 23/12; G01L 1/146; G01L 1/241; G01L 7/045; G01L 1/086; G01L 7/108; G01L 9/18; G01L 13/04; G01L 17/005; G01L 5/18; G01L 1/127; G01L 1/22; G01L 1/245; G01L 21/32; G01L 1/183; G01L 1/2218; G01L 9/0023; G01L 1/243; G01L 23/145; G01L 5/0047; G01L 9/0088; G01L 1/106; G01L 5/0076; G01L 1/10; G01L 1/186; G01L 23/223; G01L 25/00; G01L 5/165; G01L 9/001; G01L 9/0017; G01L 1/044; G01L 3/245; G01L 5/226; G01L 1/08; G01L 21/16; G01L 3/1485; G01L 5/162; G01L 5/225; G01L 7/026; G01L 7/065; G01L 9/0014; G01L 1/242; G01L 21/24; G01L 3/10; G01L 5/0004; G01L 5/0052; G01L 9/005; G01L 1/00; G01L 1/04; G01L 1/103; G01L 1/2275; G01L 1/247; G01L 21/02; G01L 21/26; G01L 23/225; G01L 3/102; G01L 3/105; G01L 5/0038; G01L 5/223; G01L 5/24; G01L 7/028; G01L 7/10; G01L 9/0011; G01L 5/243; G01L 1/083; G01L 1/12; G01L 21/36; G01L 23/04; G01L 23/14; G01L 23/30; G01L 3/103; G01L 5/00; G01L 5/0028; G01L 5/102; G01L 5/133; G01L 5/166; G01L 7/185; G01L 1/255; G01L 21/08; G01L 5/0033; G01L 5/0057; G01L 5/161; G01L 1/042; G01L 1/122; G01L 1/2225; G01L 1/2243; G01L 1/2256; G01L 1/248; G01L 2009/0066; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/08; G01L 5/10; G01L 5/101; G01L 5/108; G01L 5/16; G01L 5/1627; G01L 5/167; G01L 5/22; G01L 5/28; G01L 23/085; G01L 23/20; G01L 5/0061; G01L 5/0071; G01L 5/008; G01L 5/06; G01L 5/171; G01L 7/106
USPC .................................................. 73/700–756
See application file for complete search history.

(56) References Cited

U.S. PATENT DOCUMENTS

| | | | |
|---|---|---|---|
| 6,484,586 | B1 | 11/2002 | Dutoit et al. |
| 8,210,048 | B2* | 7/2012 | Funken ............... F16J 3/02 |
| | | | 73/706 |
| 11,243,134 | B2* | 2/2022 | Schulte ............. G01L 27/007 |
| 2007/0095146 | A1 | 5/2007 | Brosh |
| 2022/0042869 | A1* | 2/2022 | Lopatin ............... G01L 9/14 |

FOREIGN PATENT DOCUMENTS

| | | |
|---|---|---|
| DE | 3106835 A1 | 9/1982 |
| DE | 102004019222 A1 | 11/2005 |
| DE | 102005055285 A1 | 5/2007 |

(56) References Cited

FOREIGN PATENT DOCUMENTS

| | | |
|---|---|---|
| DE | 102006043499 A1 | 3/2008 |
| DE | 102010035965 A1 | 3/2012 |
| DE | 102016005569 A1 | 1/2017 |
| EP | 3112834 B1 | 4/2021 |
| WO | 2005026682 A1 | 3/2005 |

* cited by examiner

PRESSURE GAUGE COMPRISING A DEVICE FOR DEFLECTING AN ISOLATION DIAPHRAGM

CROSS-REFERENCE TO RELATED APPLICATIONS

The present application is related to and claims the priority benefit of German Patent Application No. 10 2018 133 053.7, filed on Dec. 20, 2018 and International Patent Application No. PCT/EP2019/082029, filed on Nov. 21, 2019, the entire contents of which are incorporated herein by reference.

TECHNICAL FIELD

The invention relates to a pressure gauge, comprising
a pressure sensor, and
a pressure transmitter connected upstream of the pressure sensor and having an isolation diaphragm, the outer side of which can be supplied with pressure and under which a pressure receiving chamber is enclosed, and
a hydraulic pressure transmission path which is connected to the pressure receiving chamber and filled with a pressure transmitting fluid, and which transmits the pressure acting on the outer side of the isolation diaphragm to the pressure sensor.

BACKGROUND

Pressure gauges comprise gauges designed as absolute pressure gauges, as relative pressure gauges, and as differential pressure gauges and are used for measuring pressures.

In industrial applications, in particular, it is of particular importance that pressure gauges have a consistently high measuring accuracy and any functional impairments of the pressure gauge, especially impairments affecting the measuring accuracy and/or operational safety, can be detected and remedied as early as possible. Major causes of such impairments are functional impairments of the pressure sensor, of the pressure transmitting fluid and of the isolation diaphragm.

A major cause of functional impairments of pressure sensors comprising a measuring diaphragm is that the pressure sensitivity of the measuring diaphragm changes over time, for example by aging or by overloading. Said functional impairments can be detected, for example, in the manner described in DE 10 2007 016 792 A1 or in DE 196 01 078 A1, in that a deflection means for deflecting the measuring diaphragm is integrated in the pressure sensor, and the deflection of the measuring diaphragm caused by the deflection means is detected by means of an electromechanical transducer. This makes it possible to determine, for example, changes in the stiffness of the measuring diaphragm that affect the measuring accuracy of the pressure sensor. However, functional impairments of the pressure transmitting fluid and of the isolation diaphragm of pressure gauges of the type mentioned at the outset cannot be identified in this way. Functional impairments of the isolation diaphragm can be caused, for example, by corrosion, abrasion or embrittlement of the isolation diaphragm exposed under certain circumstances to very harsh process conditions or by accretion on the outer side of the isolation diaphragm. Said functional impairments can be identified, for example, in the manner described in DE 10 2005 055 285 A1. A pressure gauge having the features mentioned at the outset is described therein. Said pressure gauge comprises a hydraulic exciter driven by an excitation circuit, which exciter serves to impress pressure fluctuations on the hydraulic pressure transmission path. In addition, the gauge comprises an evaluation unit which determines a dependence of the pressure measured by means of the pressure sensor on the impressed pressure fluctuations and derives conclusions therefrom on the state of the isolation diaphragm. Use is made of the fact that accretion on the outer side of the isolation diaphragm has a different effect on the oscillation behavior of the isolation diaphragm excited to forced oscillations by the pressure fluctuations than do impairments that reduce the stiffness of the isolation diaphragm, such as are caused, for example, by corrosion or abrasion of the isolation diaphragm.

In addition, DE 10 2005 055 285 A1 describes providing the pressure gauge with a deflection sensor with which the frequency-dependent deflection of the isolation diaphragm is measured. In this case, the evaluation unit can also derive conclusions on the state of the isolation diaphragm on the basis of the dependence of the measured deflections of the isolation diaphragm on the impressed pressure fluctuations.

A disadvantage here, however, is that the pressure acting externally on the isolation diaphragm counteracts the pressure fluctuations caused by the exciter. The consequence of this is that this pressure and the properties of the medium exerting this pressure on the isolation diaphragm, for example its density, compressibility or toughness, impair the functional test of the isolation diaphragm described in DE 10 2005 055 285 A1 and should be taken into account accordingly.

A further disadvantage is that the amplitude of the impressed pressure fluctuations depends on the pressure transmission properties of the pressure transmitting fluid. However, the latter may change under certain circumstances during ongoing operation. Causes of this are, for example, gas bubbles forming in the fluid, which lead to an increased compressibility of the pressure transmitting fluid. Gas bubbles are produced, for example, by decomposition of the pressure transmitting fluid at high temperatures or by hydrogen penetrating into the pressure transmission path, which passes through metallic isolation diaphragms by diffusion, for example. Changes in the pressure transmission properties of the pressure transmitting fluid result in an impairment of the functional test of the isolation diaphragm which can be carried out by means of the exciter, without being detectable as functional impairments of the pressure transmitting fluid.

Nowadays, pressure gauges are calibrated at regular intervals in order to ensure the most consistently high measurement accuracy of pressure gauges possible. Known pressures of a magnitude that can be specified as precisely as possible are supplied to the isolation diaphragm of the pressure gauge and the measuring accuracy of the pressure gauge is checked on the basis of the pressures measured by the pressure gauge during these pressurizations. However, pressurizing the isolation diaphragm at predetermined pressures of a precisely determinable magnitude requires the pressure gauge to be removed regularly from the point of use or at least a drastic intervention in the process underway at the point of use.

SUMMARY

It is an object of the invention to specify a pressure gauge which allows functional impairments of the pressure gauge, especially impairments affecting the measuring accuracy and/or operational safety, to be detected early, without having to change the pressure acting on the outer side of the isolation diaphragm and/or having to take into consideration the properties of the medium exerting said pressure on the isolation diaphragm.

To this end, the invention comprises a pressure gauge having a pressure sensor, a pressure transmitter connected upstream of the pressure sensor and having an isolation diaphragm, the outer side of which can be supplied with pressure and under which a pressure receiving chamber is enclosed, and a hydraulic pressure transmission path which is connected to the pressure receiving chamber and filled with a pressure transmitting fluid, and which transmits the pressure acting on the outer side of the isolation diaphragm to the pressure sensor, which is characterized in that the pressure transmitter comprises an electronically activatable deflection device which is designed in such a way that, when activated, it exerts a constant force deflecting the isolation diaphragm, on the isolation diaphragm or on an element connected to the isolation diaphragm.

Pressure gauges according to the invention offer the advantage that the force exerted on the isolation diaphragm or the element by means of the deflection device can be connected in a defined and controllable manner and affects the entire pressure gauge like a pressure change, corresponding to the predetermined, constant force, in the pressure acting on the outer side of the isolation diaphragm. Since the measured pressure depends on the properties of the isolation diaphragm, the pressure transmitting fluid and the pressure sensor, functional impairments of all these components directly affect the change caused by the force in the pressure measured by means of the pressure sensor and can thus be detected early on the basis of the measured pressure.

Since the force is exerted directly on the isolation diaphragm or the element connected thereto, the force can be predetermined and exerted in a controlled and defined manner even if the pressure transmission properties of the pressure transmitting fluid change in an unknown manner. In contrast to the amplitudes of pressure fluctuations impressed on the hydraulic pressure transmission path by means of an exciter, the force exerted by the deflection device on the isolation diaphragm is not dependent on the properties of the pressure transmitting fluid.

Since the force exerted on the isolation diaphragm by the activated deflection device is constant, the effect of this force on the measured pressure does not depend on the pressure acting externally on the isolation diaphragm or on the properties of the medium exerting this pressure on the outer side of the isolation diaphragm. Accordingly, the functioning of the pressure gauge can be checked at any time without the pressure which acts on the outer side of the isolation diaphragm having to be known or having to be changed in the process, and without the properties of the medium impairing the check.

A second development is characterized in that the isolation diaphragm is magnetic or ferromagnetic or is connected to a magnetic or ferromagnetic element, and the deflection device comprises an electronically activatable electromagnet which, when activated, exerts the force deflecting the isolation diaphragm, on the isolation diaphragm, or on the element connected thereto.

A development of the first development is characterized in that the pressure gauge comprises a deflection measuring circuit which can be connected or is connected to the electromagnet and is designed such that it determines a deflection of the isolation diaphragm dependent on the pressure acting on the isolation diaphragm when the deflection device is deactivated, on the basis of a property of the electromagnet dependent on the deflection of the isolation diaphragm, on the basis of an inductance of the electromagnet, or on the basis of a variable dependent on the inductance of the electromagnet, and comprises a testing device designed in such a way that it checks the functioning and/or the measuring accuracy of the pressure gauge when the deflection device is deactivated, on the basis of the pressure measured by means of the pressure sensor and the deflection of the isolation diaphragm determined in parallel thereto by means of the deflection measuring circuit.

A second development is characterized in that the isolation diaphragm consists at least in sections or as a whole of a magnetic material, of a ferromagnetic material, of a ferromagnetic steel, of a ferritic steel, of a duplex steel or of a superduplex steel.

A third development is characterized in that the magnetic or ferromagnetic element connected to the isolation diaphragm comprises a disk arranged on an inner side of the isolation diaphragm facing into the pressure receiving chamber, wherein the disk a) consists of a magnetic or ferromagnetic material, of a magnetic or ferromagnetic metallic alloy, of a ferromagnetic steel, of a ferritic steel, of a duplex steel, of a superduplex steel, of iron, of cast iron, of a magnetic or ferromagnetic ceramic, of a ferritic ceramic or of an iron oxide, b) is applied as a coating or as a galvanic coating to the isolation diaphragm or is connected to the isolation diaphragm by joining or soldering, c) with a material thickness of the isolation diaphragm of from 25 µm to 200 µm has a disk thickness of from 0.1 µm to 500 µm, with a material thickness of the isolation diaphragm of from 25 µm to 100 µm has a disk thickness of from 0.1 µm to 300 µm, or with a material thickness of the isolation diaphragm of from 50 µm to 200 µm has a disk thickness of from 10 µm to 500 µm, and/or d) has a diameter which is smaller than a diameter of the isolation diaphragm and/or has a diameter of from 2 mm to 15 mm when the isolation diaphragm has a diameter of from 20 mm to 90 mm, wherein the disk is arranged concentrically with respect to the isolation diaphragm.

A fourth development is characterized in that the element connected to the isolation diaphragm comprises a permanent magnet mounted on an inner side of the isolation diaphragm facing into the pressure receiving chamber.

A development of the fourth development is characterized in that the permanent magnet extends into an end region of the pressure transmission path, adjacent to the pressure receiving chamber, which is enclosed externally at least in sections by a coil of the electromagnet.

Developments of the first development are characterized in that the electromagnet is integrated in the pressure transmitter, the electromagnet comprises a coil which can be connected to a direct current source via an electronically controllable switching device, the coil is oriented such that an extension of its longitudinal axis parallel to the surface normal runs onto the isolation diaphragm through the center of the isolation diaphragm, the coil is arranged such that it encloses a section of the pressure transmission path extending from the pressure receiving chamber to the pressure sensor externally on all sides, and/or the electromagnet comprises a hollow cylindrical core which is surrounded at least in sections by the coil and through which an end region of the hydraulic pressure transmission path leading into the pressure receiving chamber extends.

A fifth development is characterized in that the pressure gauge comprises a testing device which is designed to carry out functional tests of the pressure gauge, in which the deflection device is activated for the duration of a predetermined period in each case and the testing device checks the pressure gauge on the basis of the pressure measured during the respective functional test by means of the pressure sensor.

A development of the fifth development is characterized in that the testing device is designed such that, on the basis of the pressure measured by means of the pressure sensor during the respective functional test, it determines a sudden pressure change in the measured pressure attributable to the activation of the deflection device, and the testing device is designed in such a way that it
a) determines a functional impairment of the pressure gauge if the pressure change deviates from a reference value predetermined for this purpose by more than a predetermined tolerance, and/or,
b) on the basis of the difference between the pressure change and the reference value, checks a measuring accuracy of the pressure gauge, outputs an impairment of the measuring accuracy when the absolute value of the difference exceeds a predetermined limit value, and/or determines and outputs a degree of impairment of the measuring accuracy on the basis of the absolute value of the difference.

Another development of the fifth development is characterized in that the deflection device is designed in such a way that, when activated, it exerts a constant force deflecting the isolation diaphragm in the direction of its diaphragm bed, the testing device is designed such that, on the basis of the pressure measured by means of the pressure sensor during the respective functional test, it determines a pressure change in the measured pressure in the form of a pressure increase and attributable to the activation of the deflection device, and the testing device is designed in such a way that it:
a) outputs a reduced stiffness of the isolation diaphragm as a possible cause of a functional impairment if the pressure increase exceeds a limit value predetermined for this purpose,
b) outputs an increased stiffness of the isolation diaphragm as a possible cause of a functional impairment if the pressure increase falls below a limit value predetermined for this purpose,
c) outputs an increased pressure sensitivity of the pressure sensor and/or a reduced stiffness of a measuring diaphragm of the pressure sensor as a possible cause of a functional impairment if the pressure increase exceeds a limit value predetermined for this purpose, and/or
d) outputs a reduced compressibility of the pressure transmitting fluid as a possible cause of a functional impairment if the pressure increase falls below a limit value predetermined for this purpose.

Another development of the fifth development is characterized in that the testing device is designed such that it compares a time curve of the pressure measured during the functional test with a reference curve which is predetermined for this purpose and/or, on the basis of the time curve, derives at least one characteristic variable dependent upon the time curve and compares it with a reference value predetermined for this purpose and detects a functional impairment if the curve deviates from the reference curve by more than a predetermined extent and/or the characteristic variable deviates from the reference value by more than a predetermined extent.

Another development of the fifth development is characterized in that the deflection device is designed in such a way that, when activated, it exerts a constant force deflecting the isolation diaphragm in the direction of its diaphragm bed, and the testing device is designed in such a way that it detects and outputs a leak in the pressure gauge when the measured pressure falls from a maximum pressure by more than a predetermined value during the period.

The invention further relates to a method for the functional testing of a pressure gauge according to the invention, characterized in that at least one functional test is carried out, in which the deflection device is activated for the duration of a predetermined period, and the function of the pressure gauge is checked on the basis of the pressure measured by means of the pressure sensor during the respective functional test, on the basis of a sudden pressure change in the pressure measured during the respective functional test by means of the pressure sensor and attributable to the activation of the deflection device, and/or on the basis of a time curve of the pressure measured during the respective functional test by means of the pressure sensor.

A development of the method is characterized in that at least one functional test is carried out in such a way that the deflection device exerts a constant force which deflects the isolation diaphragm in the direction of its diaphragm bed during the period, and in this functional test:
a) the pressure change in the measured pressure, which is in the form of a pressure increase and is attributable to the activation of the deflection device, is determined, and
a1) a reduced stiffness of the isolation diaphragm is determined as a possible cause of a functional impairment if the pressure increase exceeds a limit value predetermined for this purpose,
a2) an increased stiffness of the isolation diaphragm is determined as a possible cause of a functional impairment if the pressure increase falls below a limit value predetermined for this purpose,
a3) an increased pressure sensitivity of the pressure sensor and/or a reduced stiffness of a measuring diaphragm of the pressure sensor is determined as a possible cause of a functional impairment if the pressure increase exceeds a limit value predetermined for this purpose,
a4) a reduced compressibility of the pressure transmitting fluid is determined as a possible cause of a functional impairment if the pressure increase falls below a limit value predetermined for this purpose, and/or
b) a leak in the pressure gauge is detected if the measured pressure falls from a maximum pressure by more than a predetermined value during the period.

Furthermore, the invention comprises a pressure gauge according to the invention, characterized in that the pressure sensor is a differential pressure sensor, upstream of which a second pressure transmitter is connected having an isolation diaphragm, the outer side of which can be supplied with a second pressure and under which a pressure receiving chamber is enclosed which is connected to a hydraulic pressure transmission path filled with a pressure transmitting fluid, and which transmits the second pressure acting on the outer side of the isolation diaphragm to the pressure sensor, the second pressure transmitter comprises an electronically activatable deflection device which is designed in such a way that, when activated, it exerts a constant force deflecting the isolation diaphragm of the second pressure transmitter, on the isolation diaphragm or on an element connected to the isolation diaphragm, and the pressure gauge comprises a testing device which is designed to carry out functional tests of the pressure gauge, in which one of the two deflection devices is activated for the duration of a predetermined period in each case, and the testing device checks the pressure gauge on the basis of the differential pressure measured during the respective functional test by means of the pressure sensor, on the basis of a sudden pressure change in the differential pressure measured during the respective functional test by means of the pressure sensor and attributable to the activation of the respective deflection device, and/or on the basis of a time curve of the differential pressure measured during the respective functional test by means of the pressure sensor.

A development of the latter pressure gauge is characterized in that the isolation diaphragms are magnetic or ferromagnetic or are connected to a magnetic or ferromagnetic element, each deflection device in each case comprises an electronically activatable electromagnet which, when activated, exerts the force deflecting the respective isolation diaphragm on the isolation diaphragm or on the element connected thereto, the pressure gauge comprises for each electromagnet in each case a deflection measuring circuit which can be connected or is connected to the electromagnet and is designed such that it determines a deflection of the isolation diaphragm dependent on the pressure acting on the isolation diaphragm when the deflection device is deactivated, on the basis of a property of the electromagnet dependent on the deflection of the isolation diaphragm, on the basis of the inductance of the electromagnet, or on the basis of a variable dependent on the inductance of the electromagnet, and the testing device is designed such that it checks the functioning and/or the measuring accuracy of the pressure gauge on the basis of the measured differential pressure and the difference between the deflections of the two isolation diaphragms measured by means of the two deflection measuring circuits, while both deflection devices are deactivated.

BRIEF DESCRIPTION OF THE DRAWINGS

The invention and its advantages will now be explained in detail with reference to the figures in the drawing which show four exemplary embodiments. The same elements are provided with the same reference signs in the figures. In order to be able to show components which sometimes have very different sizes, an illustration that is not always true-to-scale was chosen.

DETAILED DESCRIPTION

Figure 1:
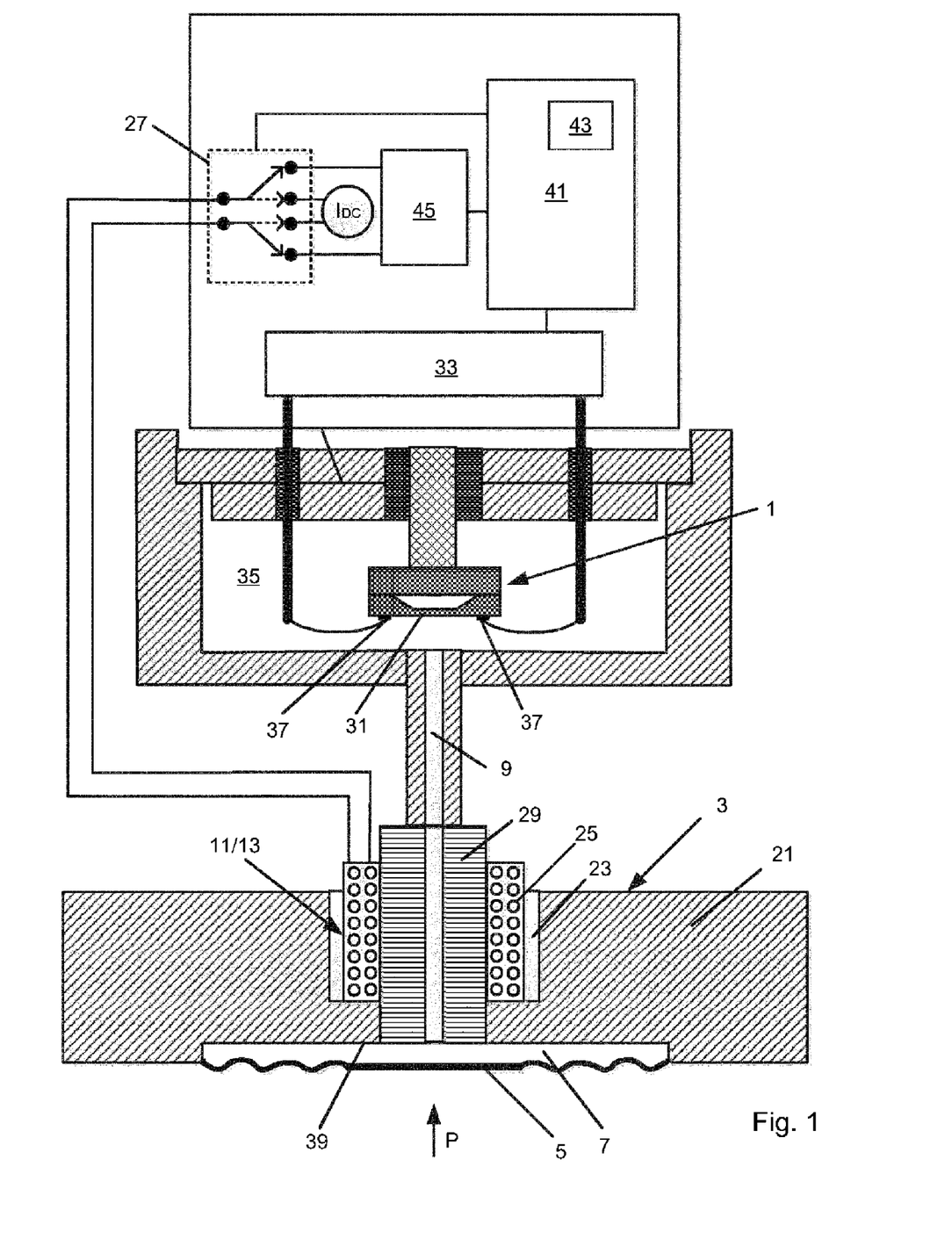
FIG. 1 shows a pressure gauge having a pressure transmitter with a magnetic or ferromagnetic isolation diaphragm.

FIG. 1 shows an example of a pressure gauge according to the invention comprising a pressure sensor 1 and a pressure transmitter 3 upstream of the pressure sensor 1. The pressure transmitter 3 comprises an isolation diaphragm 5, the outer side of which can be acted on by a pressure p to be measured by the pressure gauge. A pressure receiving chamber 7 is enclosed below the isolation diaphragm 5. Connected to the pressure receiving chamber 7 is a hydraulic pressure transmission path 9 which is filled with a pressure transmitting fluid and transmits the pressure p acting on the outer side of the isolation diaphragm 5 to the pressure sensor 1.

Pressure gauges according to the invention are characterized in that their pressure transmitter 3 comprises an electronically activatable deflection device 11 which is designed in such a way that, when activated, it exerts a constant force K deflecting the isolation diaphragm 5, on the isolation diaphragm 5 or on an element connected to the isolation diaphragm 5.

Pressure gauges according to the invention have the advantages mentioned at the outset. Individual components can have different embodiments that can be used individually or also in combination with one another.

FIG. 1 shows an example in which the isolation diaphragm 5 is magnetic or ferromagnetic and the deflection device 11 comprises an electronically activatable electromagnet 13 which, when activated, exerts the force K deflecting the isolation diaphragm 5, on the isolation diaphragm 5. In said embodiment, the isolation diaphragm 5 consists at least in sections, but preferably entirely of a magnetic or ferromagnetic material. In this respect, the isolation diaphragm 5 can consist, for example, of a magnetic alloy, of a ferromagnetic alloy, of a ferromagnetic steel, of a ferritic steel, of a duplex steel or of a superduplex steel.

Said embodiment offers the advantage that no components which change the pressure transmission properties of the isolation diaphragm 5 are required for generating the force, and that the magnetic attraction or repulsion force exerted by the activated electromagnet 13 acts directly on the isolation diaphragm 5. It is, therefore, particularly suitable especially for pressure gauges with which comparatively small pressures p acting on the outer side of the isolation diaphragm 5, such as pressures of less than or equal to 5 bar, are measured and/or which have a comparatively high measuring accuracy.

Alternatively, the isolation diaphragm 5 can be connected to a magnetic or ferromagnetic element and the deflection device 11 can comprise the electronically activatable electromagnet 13 which, when activated, exerts the force K deflecting the isolation diaphragm 5, on the element connected to the isolation diaphragm 5.

Figure 2:
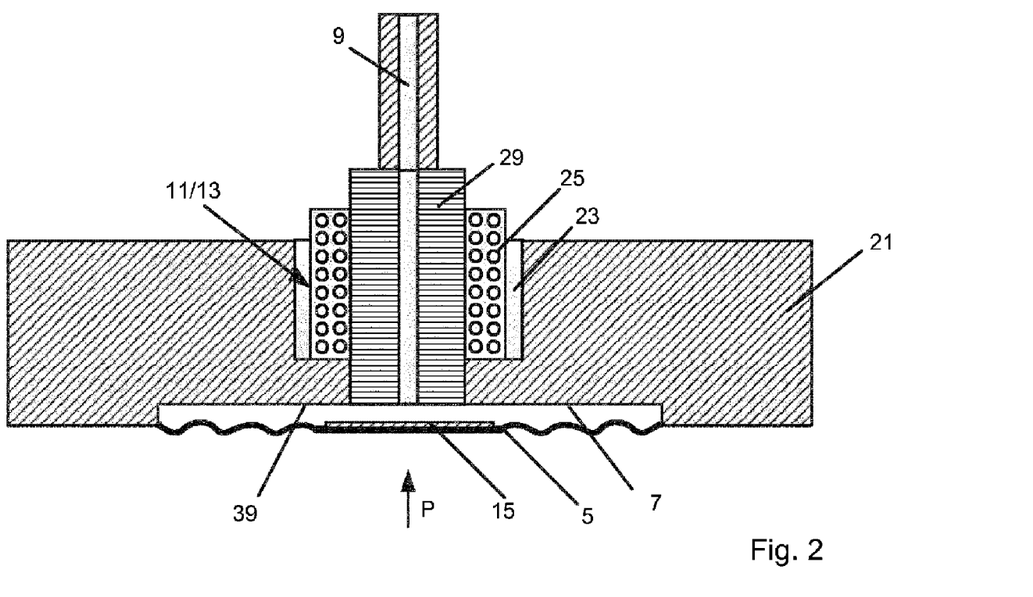
FIG. 2 shows a pressure transmitter on whose isolation diaphragm a magnetic or ferromagnetic disk is arranged.

As an example thereof, FIG. 2 shows a pressure transmitter which can be used instead of the pressure transmitter 3 shown in FIG. 1, in which a magnetic or ferromagnetic disk 15 connected to the isolation diaphragm 5 is arranged on an inner side of the isolation diaphragm 5 facing into the pressure receiving chamber 7. This embodiment offers the advantage that the material of the isolation diaphragm 5 is freely selectable within further limits and the isolation diaphragm 5 can optionally also consist of a non-magnetic material such as, for example, a stainless steel, especially an austenitic stainless steel.

A disk 15 made of a magnetic or ferromagnetic material is suitable as the disk 15. In this respect, the disk 15 can consist, for example, of a magnetic or ferromagnetic metallic alloy, of a ferromagnetic steel, of a ferritic steel, of a duplex steel, of a superduplex steel, of iron or of cast iron. Alternatively, however, the disk 15 can also consist of a magnetic or ferromagnetic ceramic or of a ferritic ceramic, such as, for example, an iron oxide.

Depending on the thickness and the material of the disk 15, the disk 15 can be applied to the isolation diaphragm 5, for example as a coating, for example as a galvanic coating, or can be connected to the isolation diaphragm 5 by joining, such as soldering.

As an alternative or in addition, the disk 15 preferably has a layer thickness of from 0.1 µm to 500 µm. In comparison thereto, the isolation diaphragm 5 can have, for example, a material thickness in the range of from 25 µm to 200 µm. In this case, the greater the pressures p to be measured by means of the pressure gauge are, the greater the material thickness of the isolation diaphragm 5 is preferably set. In this respect, with a material thickness of the isolation diaphragm 5 of from 25 µm to 100 µm, the disk 15 preferably has a disk thickness of from 0.1 µm to 300 µm, whereas with a material thickness of the isolation diaphragm 5 of from 50 µm to 200 µm, it preferably has a disk thickness of from 10 µm to 500 µm.

In principle, the disk 15 can be applied to the isolation diaphragm 5 with a comparatively small disk thickness as a full-area coating. Preferably, however, the disk 15 arranged concentrically to the isolation diaphragm 5 has a diameter which is smaller than a diameter of the isolation diaphragm 5. In this respect, with a diameter of the isolation diaphragm 5 of from 20 mm to 90 mm, the disk 15 preferably has a diameter of from 2 mm to 15 mm. Said embodiment offers the advantage that the pressure transmission properties of the isolation diaphragm 5 are changed only to a comparatively small extent by the disk 15, connected here only to a central diaphragm region of the isolation diaphragm 5, even if the thickness of the disk 15 comparatively large and/or the disk thickness is greater than the material thickness of the isolation diaphragm 5.

Figure 3:
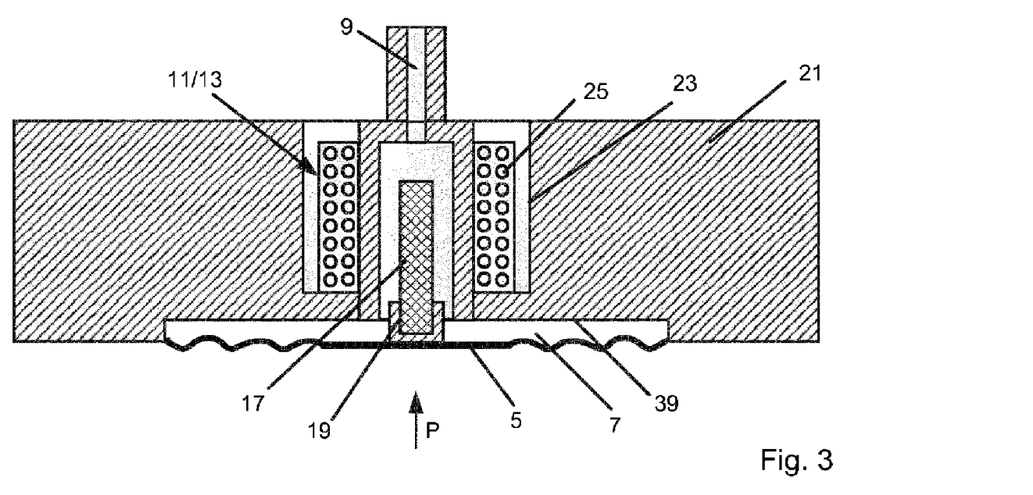
FIG. 3 shows a pressure transmitter with an isolation diaphragm connected to a permanent magnet.

FIG. 3 shows as a further example a pressure transmitter which can be used instead of the pressure transmitter 3 shown in FIG. 1, in which a permanent magnet 17 is mounted on an inner side of the isolation diaphragm 5 facing into the pressure receiving chamber 7. Said permanent magnet 17 can be mounted, for example, on a mount 19 which is arranged on the inner side of the isolation diaphragm 5 and is connected to the isolation diaphragm 5.

Said embodiment also offers the advantage that the isolation diaphragm 5 can optionally consist of a non-magnetic material such as, for example, a stainless steel, especially an austenitic stainless steel. Furthermore, it offers the advantage that, via the permanent magnet 17 connected to the isolation diaphragm 5, much greater forces can be exerted on the isolation diaphragm 5 by means of the electromagnet 13 than is possible with the variants shown in FIGS. 1 and 2. Therefore, said embodiment is advantageous especially in connection with pressure gauges for measuring greater pressures which have isolation diaphragms 5 that are correspondingly stiff and/or have a comparatively large material thickness.

Irrespective of whether the isolation diaphragm 5 is magnetic or ferromagnetic or is connected to a magnetic or ferromagnetic element, such as the disk 15 shown in FIG. 2 or the permanent magnet 17 shown in FIG. 3, the electromagnet 13 is preferably integrated in the pressure transmitter 3. This saves space and, due to the associated small distance between the electromagnet 13 and the magnetic or ferromagnetic isolation diaphragm 5 or the magnetic or ferromagnetic element connected to the isolation diaphragm 5, offers the advantage that the activated electromagnet 13 can exert a comparatively large force K on the isolation diaphragm 5 due to the small distance.

FIGS. 1 to 3 show examples in which the pressure transmitter 3 comprises a carrier 21, on the end face of which the pressure receiving chamber 7 closed to the outside by the isolation diaphragm 5 is arranged. The carrier 21 has there on its rear side opposite the end face a recess 23 into which the electromagnet 13 or at least a portion of the electromagnet 13 is inserted.

In the exemplary embodiments shown, the electromagnet 13 in each case comprises a coil 25 which can be connected via an electronically controllable switching device 27 shown in FIG. 1 to a direct current source IDC integrated in the pressure gauge. So the activation of the deflection device 11 takes place here in each case in that the switching device 27 is actuated in such a way that the coil 25 is connected to the direct current source IDC.

In the alternative or in addition thereto, the coil 25 is preferably oriented in such a way that an extension of its longitudinal axis runs parallel to a surface normal on the isolation diaphragm 5 through the center of the isolation diaphragm 5. In the alternative or in addition thereto, the coil 25 is preferably arranged in such a way that it encloses a section of the pressure transmission path 9 extending from the pressure receiving chamber 7 to the pressure sensor 1 externally on all sides.

Optionally, the electromagnet 13 can comprise a core 29 which increases the force that can be exerted by means of the electromagnet 13 and is enclosed at least in sections by the coil 25. In said embodiment shown in FIGS. 1 and 2, the core 29 is preferably hollow cylindrical and arranged in such a way that an end region of the hydraulic pressure transmission path 9 adjacent to the pressure receiving chamber 7 passes through the core 29.

In the exemplary embodiment illustrated in FIG. 3, the pressure transmitter 3 is preferably designed in such a way that the permanent magnet 17 extends into an end region of the pressure transmission path 9, adjacent to the pressure receiving chamber 7, which is enclosed on the outside at least in sections by the coil 25 of the electromagnet 13.

Pressure sensors known from the prior art which, depending on the type of pressure gauge, are designed, for example, as absolute, relative or differential pressure sensors can be used as the pressure sensor 1. Said pressure sensors regularly comprise a measuring diaphragm 31 to be subjected to the pressure to be measured and an electromechanical transducer, for example a capacitive or resistive transducer, which converts the pressure-dependent deflection of the measuring diaphragm 31 into an electrical variable. In addition, they comprise a pressure measuring circuit 33 connected to the transducer, which circuit detects the pressure-dependent variable metrologically and provides a measurement signal corresponding to the measured pressure $p_{gem}$.

FIG. 1 shows an example thereof in which the pressure sensor 1 is arranged in a pressure measuring chamber 35, which is connected to the pressure transmission path 9 and likewise filled with the pressure transmitting fluid, in such a way that the pressure prevailing in the pressure measuring chamber 35 acts on the outer side of the measuring diaphragm 31. The pressure sensor 1 shown here as an example is designed as an absolute pressure sensor, the transducer of which comprises the piezoresistive elements 37 which are shown in FIG. 1 and are connected to form a bridge circuit.

The advantage of pressure gauges according to the invention is that their functioning can be checked at any time on the basis of the effect of the force K, which can be connected by activating the deflection device 11 and deflects the isolation diaphragm 5, on the pressure $p_{gem}$ measured by means of the pressure sensor 1. Said functional tests can be carried out at predetermined or predeterminable times, for example on request, in an event-driven manner or recurrently, for example periodically.

In order to carry out functional tests, it is advantageous to configure the deflection device 11 such that, when activated, it exerts a constant force K, deflecting the isolation diaphragm 5 in the direction of its diaphragm bed 39, on the isolation diaphragm 5 or on the element connected thereto. Alternatively, however, it would also be possible to operate the deflection device 11 in such a way that the isolation diaphragm 5 is deflected outwards in the direction pointing out of the diaphragm bed 39 by the force K in the direction opposite thereto. In the exemplary embodiments described above, both force directions can be realized by a corresponding polarity and orientation of the electromagnet 13.

Functional tests can be carried out, for example, by the user in that the user triggers the electronic activation of the deflection device 11 during the respective functional test and checks the pressure gauge based on the pressure $p_{gem}$ measured during the functional test.

As an alternative or in addition thereto, the pressure gauge is preferably designed such that it can automatically perform functional tests. For this purpose, the pressure gauge comprises a testing device 41 which is designed to carry out functional tests of the pressure gauge, in which the deflection device 11 is activated for the duration of a predetermined period T in each case and the testing device 41 checks the pressure gauge on the basis of the pressure $p_{gem}$ measured during the respective functional test by means of the pressure sensor 1.

Figure 4:
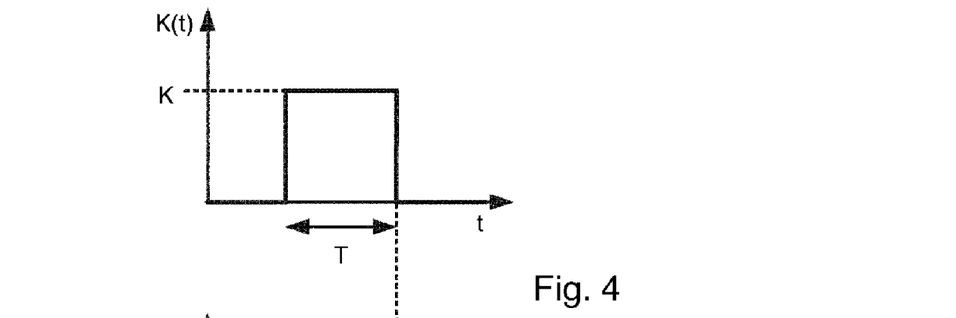
FIG. 4 shows a force deflecting the isolation diaphragm during a functional test as a function of time.

During the period T, the deflection device 11 exerts the constant force K of predetermined magnitude on the isolation diaphragm 5. FIG. 4 shows the force K(t) exerted by the deflection device 11 on the isolation diaphragm 5 as a function of time t in a test period comprising the period T. In this test period, the deflection device 11 is deactivated before and after the period T, wherein, when deactivated, it does not exert any force on the isolation diaphragm 5. During the period T, it is activated and exerts the constant force K of predetermined magnitude on the isolation diaphragm 5.

Figure 5:
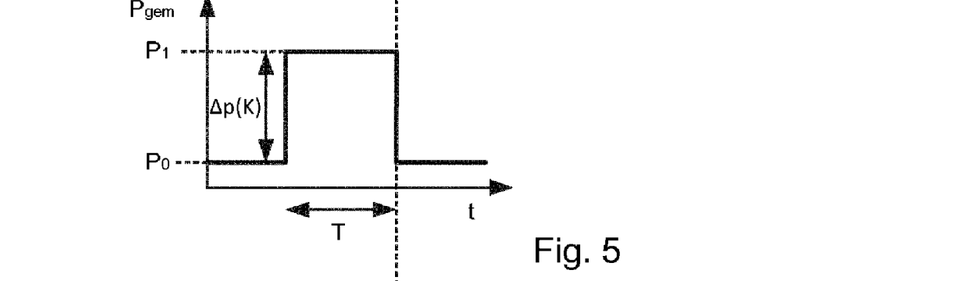
FIG. 5 shows a pressure measured within the scope of a functional test with a perfectly operating pressure gauge as a function of time.

In the case of a correctly operating pressure gauge, this procedure results in the measured pressure $p_{gem}$ having the time curve shown in FIG. 5 throughout the test period. As can be seen from FIG. 5, the measured pressure $p_{gem}$ has a value $p_0$ corresponding to the pressure p acting on the isolation diaphragm 5 from the outside before and after the period T and a value $p_1$ dependent on the pressure p and the constant force K during the period T.

For the functional test of the pressure gauge, different test methods can be used which can be carried out on the basis of the measured pressure $p_{gem}$ by means of the testing device 41 designed accordingly in each case.

For example, a test method can be carried out which is based on the fact that activating the deflection device 11 causes a sudden pressure change $\Delta p_{gem}$ in the measured pressure $p_{gem}$ that is dependent on the magnitude and direction of the force K and on the properties of the pressure gauge.

Said pressure change $\Delta p_{gem}$ is determined depending on the direction of the force K on the basis of the maximum or the minimum pressure $p_{gem}$ measured during the period T. Since the force K is constant during the period T, the pressure change $\Delta p_{gem}$ determined in this way does not depend on the properties of the medium acting on the outer side of the isolation diaphragm 5. In addition, the period T is preferably dimensioned such that it is small in comparison with a time scale on which the pressure p acting on the outer side of the isolation diaphragm 5 changes.

In order to carry out this test method, the testing device 41 is designed such that, on the basis of the pressure $p_{gem}$ measured during the respective functional test by means of the pressure sensor 1, it determines a sudden pressure change $\Delta p_{gem}$ in the measured pressure $p_{gem}$ attributable to the activation of the deflection device 11 and detects a functional impairment of the pressure gauge if the pressure change $\Delta p_{gem}$ differs by more than a predetermined tolerance from a reference value R predetermined for this purpose. In this case, the reference value R corresponds to the sudden pressure change $\Delta p(K)=p_1-p_0$, marked in FIG. 5, which is to be expected when the pressure gauge works without errors and which is preferably determined in advance and stored in a memory 43 associated with the testing device 41.

In the alternative or in addition, the testing device 41 is optionally designed such that it checks the measurement accuracy of the pressure gauge on the basis of the difference between the pressure change $\Delta p_{gem}$ and the reference value R. In this respect, it can be designed, for example, such that it outputs an impairment of the measurement accuracy if the absolute value of the difference exceeds a predetermined limit value and/or can be designed such that it determines and outputs a degree of impairment of the measurement accuracy on the basis of the absolute value of the difference. In this case, the greater the absolute value of the difference, the greater the degree of impairment.

The activation of the deflection device 11 and the resulting pressure change $\Delta p_{gem}$ takes place suddenly and thus takes place in a period which is short in comparison with a time scale in which the pressure p acting on the outer side of the isolation diaphragm 5 changes. Moreover, the force K acts on the pressure gauge exactly as would a change in the pressure p acting on the outer side of the isolation diaphragm 5. Correspondingly, the sudden pressure change $\Delta p_{gem}$ forms a variable dependent on the properties of the pressure gauge and the force K, on the basis of which functional impairments of the pressure gauge can be determined and/or its measuring accuracy can be checked without the pressure p which acts on the outer side of the isolation diaphragm 5 or its temporal variations having to be taken into account.

Optionally, a statement about possible causes of the functional impairment can additionally be derived on the basis of the deviation of the pressure change $\Delta p_{gem}$ from the reference value R. For this purpose, the deflection device 11 is preferably operated in such a way that, when activated, it deflects the isolation diaphragm 5 in the direction of its diaphragm bed 39. Accordingly, the pressure change $\Delta p_{gem}$ determined in the functional test is a pressure increase, the deviation of which from the reference value R predetermined for this purpose is determined. When determining possible causes of the functional impairment, use is made of the fact that different causes affect the pressure increase brought about by the activation of the deflection device 11 in different ways.

Since the pressure sensor 1 is protected by the upstream pressure transmitter 3, a major cause of functional impairments of the pressure sensor 1 is the fact that the pressure sensitivity of the pressure sensor 1 increases over time. The cause of this, in particular, are impairments which occur as a result of the continuous load and/or through aging, which lead to the stiffness of the measuring diaphragm 31 decreasing over time and accordingly being deflected to an ever greater extent by a pressure acting thereon. Accordingly, the testing device 41 can optionally be designed such that it outputs an increased pressure sensitivity of the pressure sensor 1 and/or a reduced stiffness of the measuring diaphragm 39 of the pressure sensor 1 as a possible cause of a functional impairment if the pressure increase determined within the scope of a functional test exceeds a limit value predetermined for this purpose.

As mentioned at the outset, a major cause of functional impairments of the pressure transmitting fluid is that its compressibility increases over time, for example due to gas bubble formation or penetrating hydrogen. An increase in the compressibility of the pressure transmitting fluid results in the pressure transmitted to the pressure sensor 1 by the pressure transmitting fluid rising only to a lesser extent when the deflection device 11 is activated than would be the case with a lower compressibility. Accordingly, the testing device 41 can optionally be designed such that it outputs an increased compressibility of the pressure transmitting fluid as a possible cause of a functional impairment if the pressure increase determined within the scope of a functional test falls below a limit value predetermined for this purpose.

The pressure $p_{gem}$, which is measured by the pressure sensor 1, is dependent both in measuring operation and in the functional tests on the pressure p acting from outside on the isolation diaphragm 5 and the stiffness C of the isolation diaphragm 5. This dependency can be described approximately by the following relationship:

$$P_{gem} = \frac{K_1 P}{1 + K_2 C}$$

wherein K1 and K2 are not constants that depend on the properties of the isolation diaphragm 5. If the stiffness of the isolation diaphragm 5 decreases, it is deflected more by the force K exerted thereon by means of the deflection device 11. As a result, the pressure increase in the measured pressure $p_{gem}$ caused by the activation of the deflection device 11 is correspondingly higher. Conversely, increasing the stiffness of the isolation diaphragm 5 results in the pressure increase in the measured pressure $p_{gem}$ caused by the force K being correspondingly lower. Accordingly, the testing device 41 can optionally be designed such that it outputs a reduced stiffness of the isolation diaphragm 5 as a possible cause of a functional impairment when the pressure increase exceeds a limit value predetermined for this purpose, and/or outputs an increased stiffness of the isolation diaphragm 5 as a possible cause of a functional impairment if the pressure increase falls below a limit value predetermined for this purpose.

As an alternative or in addition to the pressure change $\Delta p_{gem}$ in the measured pressure $p_{gem}$ attributable to the activation of the deflection device 11, the time curve of the pressure $p_{gem}$ measured during the functional test can also be used for the functional test. For this purpose, the testing device 41 is optionally designed such that it compares the time curve of the pressure $p_{gem}$ measured during the functional test with a reference curve predetermined for this purpose and/or, on the basis of the time curve, derives at least one characteristic variable dependent on the time curve and compares said characteristic variable with a reference value predetermined for this purpose. In addition, the testing device 13 is preferably designed in such a way that it detects and outputs a functional impairment if the curve deviates from the reference curve by more than a predetermined extent and/or the characteristic variable deviates from the reference value by more than a predetermined extent. In this way, functional impairments can be identified which affect the time curve of the measured pressure $p_{gem}$.

Figure 6:
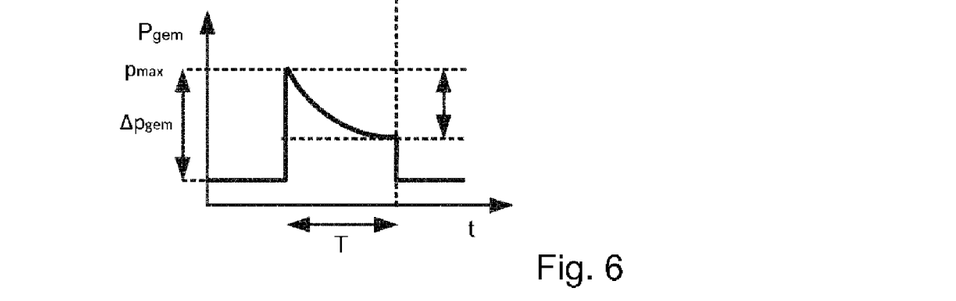
FIG. 6 shows a pressure measured within the scope of a functional test with a pressure gauge exhibiting a leak as a function of time.

These include, in particular, leaks, such as leaks of the pressure transmission path 9, the measuring diaphragm 31 or the isolation diaphragm 5 through which pressure transmitting fluid can pass. In order to be able to detect such a leak, the deflection device 11 is preferably activated for the duration of the predetermined period T in each case and is preferably designed such that, when activated, it exerts a force K deflecting the isolation diaphragm 5 in the direction of its diaphragm bed 39, on the isolation diaphragm 5 or on the element connected to the isolation diaphragm 5. In addition, the period T is predetermined in such a way that it is small in comparison with a time scale in which the pressure p acting on the outer side of the isolation diaphragm 5 changes. If it is assumed that the pressure p acting on the isolation diaphragm 5 is at least approximately constant during the period T, it can be assumed in the case of correctly functioning pressure gauges that the pressure $p_{gem}$ measured during the period T also has a substantially constant value. If the pressure gauge has a leak, this results in the pressure $p_{gem}$ measured during the functional test having a sudden increase in pressure attributable to the activation of the deflection device 11 and, subsequently, on account of the pressure transmitting fluid gradually passing through the leak, decreasing continuously during period T. An example of such a time curve of the measured pressure $p_{gem}$ is shown in FIG. 6.

Accordingly, the testing device 11 can optionally be designed in such a way that it detects and outputs a leak of the pressure gauge if the measured pressure $p_{gem}$ falls from a maximum pressure $p_{max}$ by more than a value predetermined for this purpose during the period T. In this way, the longer the period T is over which the deflection device 11 is activated, the smaller the leaks are that can be detected. Accordingly, the period T is preferably dimensioned such that it is, on the one hand, as long as possible in order to be able to reliably detect even very small leaks and, on the other hand, is small in comparison with a time scale in which the pressure p acting on the isolation diaphragm 5 from outside changes. If the pressure p changes by less than 1 mbar per second, a period T of 5 seconds to 30 seconds can be set, for example.

Optionally, pressure gauges according to the invention comprising the electromagnet 13 can additionally comprise a deflection measuring circuit 45 which can be connected or is connected to the electromagnet 13 and is designed such that it determines the deflection of the isolation diaphragm 5 dependent on the pressure p acting on the isolation diaphragm 5 when the deflection device 11 is deactivated, on the basis of a property of the electromagnet 13 dependent on the deflection of the isolation diaphragm 5, for example the inductance L of the electromagnet or a variable dependent on the inductance L of the electromagnet. To this end, FIG. 1 shows an exemplary embodiment in which the coil 25 can be connected to the direct current source IDC via the electronically controllable switching device 27 for carrying out a functional test to be performed by means of the deflection device 11 and can be connected to the deflection measuring circuit 45 for carrying out a test to be carried out on the basis of the deflection of the isolation diaphragm 5 measured by means of the deflection measuring circuit 45.

In said embodiment, the testing device 41 is preferably designed such that it checks the functioning and/or the measurement accuracy of the pressure gauge when the deflection device 11 is deactivated on the basis of the pressure $p_{gem}$ measured by means of the pressure sensor 1 and the deflection of the isolation diaphragm 5 determined in parallel thereto by means of the deflection measuring circuit 45.

Figure 7:
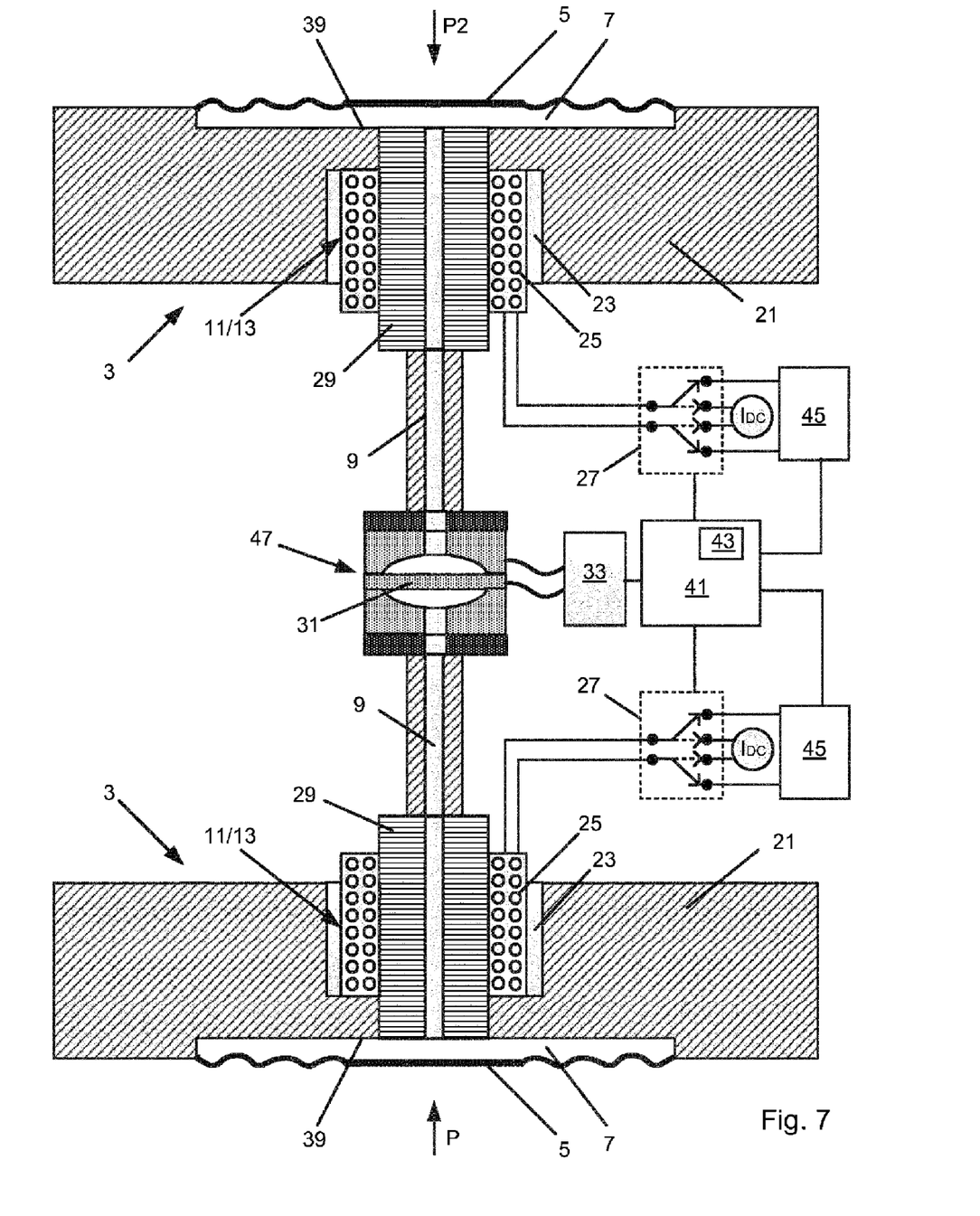
FIG. 7 shows a differential pressure gauge.

The invention can also be used completely analogously in connection with pressure gauges designed as differential pressure gauges. In this case, the pressure sensor 47 is designed as a differential pressure sensor, upstream of which is additionally connected a second pressure transmitter 3 comprising an isolation diaphragm 5, the outer side of which can be supplied with a second pressure p2 and under which a pressure receiving chamber 7 is enclosed. A hydraulic pressure transmission path 9, which is filled with a pressure transmitting fluid and which transmits the second pressure p2 acting on the outer side of the isolation diaphragm 5 of the second pressure transmitter 3 to the pressure sensor 47, is also connected to said pressure receiving chamber 7. An example of this is shown in FIG. 7. At least one of the two pressure transmitters 3 comprises a deflection device 11 designed in the manner described above. The functional test of said pressure gauges can also be carried out by the user or by means of the testing device 41 in the manner described above, in that one of the deflection devices 11 is activated and the pressure gauge is checked on the basis of a sudden pressure change, attributable to the activation of the respective deflection device 11, in the differential pressure measured during the respective functional test and/or on the basis of a time curve of the differential pressure measured during the respective functional test.

Analogously to the previously described exemplary embodiment, two deflection devices 11 each comprising an electromagnet 13, which can be connected to an associated deflection measuring circuit 45 designed in the manner described above, can optionally also be used here. In this case, the testing device 41 is preferably designed such that it checks the function of the pressure gauge on the basis of the measured differential pressure and the difference between the deflections of the two isolation diaphragms 5 measured by means of the two deflection measuring circuits 45 while both deflection devices 11 are deactivated.

The invention claimed is:

1. A pressure gauge, comprising:
a pressure sensor; and
a pressure transmitter connected upstream of the pressure sensor, the pressure transmitter including:
an isolation diaphragm under which a pressure receiving chamber is enclosed,
a hydraulic pressure transmission path connected to the pressure receiving chamber and filled with a pressure transmitting fluid, wherein the hydraulic pressure transmission path is embodied to transmit a pressure acting on an outer side of the isolation diaphragm to the pressure sensor, and
an electronically activatable deflection device configured such that, when activated, the deflection device exerts a constant force on the isolation diaphragm or on an element connected to the isolation diaphragm to deflect the isolation diaphragm.

2. The pressure gauge according to claim 1,
wherein the isolation diaphragm is magnetic or ferromagnetic or the element connected to the isolation diaphragm is a magnetic or ferromagnetic element, and
wherein the deflection device includes an electronically activatable electromagnet which, when activated, exerts the force on the isolation diaphragm or on the magnetic or ferromagnetic element connected to the isolation diaphragm to deflect the isolation diaphragm.

3. The pressure gauge according to claim 2, further comprising:
a deflection measuring circuit which is adapted to be connected to or is connected to the electromagnet and is configured to determine a deflection of the isolation diaphragm dependent on the pressure acting on the isolation diaphragm when the deflection device is deactivated, on the basis of a property of the electromagnet dependent on the deflection of the isolation diaphragm, on the basis of an inductance of the electromagnet, or on the basis of a variable dependent on the inductance of the electromagnet; and
a testing device configured to check at least one of: a functioning and a measuring accuracy of the pressure gauge when the deflection device is deactivated on the basis of a pressure measured by the pressure sensor and the deflection of the isolation diaphragm determined in parallel by the deflection measuring circuit.

4. The pressure gauge according to claim 2, wherein the isolation diaphragm consists at least in sections or as a whole of a magnetic material, of a ferromagnetic material, of a ferromagnetic steel, of a ferritic steel, of a duplex steel, or of a superduplex steel.

5. The pressure gauge according to claim 2,
wherein the magnetic or ferromagnetic element connected to the isolation diaphragm includes a disk arranged on an inner side of the isolation diaphragm facing into the pressure receiving chamber, wherein the disk:
a) consists of a magnetic or ferromagnetic material, of a magnetic or ferromagnetic metallic alloy, of a ferromagnetic steel, of a ferritic steel, of a duplex steel, of a superduplex steel, of iron, of cast iron, of a magnetic or ferromagnetic ceramic, of a ferritic ceramic, or of an iron oxide,
b) is applied as a coating or as a galvanic coating to the isolation diaphragm or is connected to the isolation diaphragm by joining or soldering,
c) when the isolation diaphragm has a material thickness from 25 μm to 200 μm, the disk has a thickness from 0.1 μm to 500 μm, when the isolation diaphragm has a material thickness of the isolation diaphragm from 25 µm to 100 µm, the disk has a disk thickness from 0.1 µm to 300 µm, or when the isolation diaphragm has a material thickness from 50 µm to 200 µm, the disk has a disk thickness from 10 µm to 500 µm, and/or d) has a diameter which is smaller than a diameter of the isolation diaphragm and/or has a diameter from 2 mm to 15 mm when the isolation diaphragm has a diameter from 20 mm to 90 mm, and wherein the disk is arranged concentrically with respect to the isolation diaphragm.

6. The pressure gauge according to claim 2,
wherein the magnetic or ferromagnetic element connected to the isolation diaphragm includes a permanent magnet mounted on an inner side of the isolation diaphragm facing into the pressure receiving chamber.

7. The pressure gauge according to claim 6,
wherein the permanent magnet extends into an end region of the pressure transmission path adjacent to the pressure receiving chamber and wherein the end region is surrounded externally at least in sections by a coil of the electromagnet.

8. The pressure gauge according to claim 2,
wherein the electromagnet is integrated in the pressure transmitter and includes a coil that is adapted to be connected to a direct current source via an electronically controllable switching device,
wherein the coil is oriented such that an extension of its longitudinal axis parallel to a surface normal of the isolation diaphragm runs onto the isolation diaphragm through the center of the isolation diaphragm,
wherein the coil is arranged such that it surrounds a section of the pressure transmission path extending from the pressure receiving chamber to the pressure sensor externally on all sides, and/or
wherein the electromagnet includes a hollow cylindrical core which is surrounded at least in sections by the coil and through which an end region of the hydraulic pressure transmission path leading into the pressure receiving chamber extends.

9. The pressure gauge according to claim 1, further comprising:
a testing device configured to carry out functional tests of the pressure gauge in which the deflection device is activated for a predetermined period and the testing device checks the pressure gauge on the basis of a pressure measured during the functional tests by the pressure sensor.

10. The pressure gauge according to claim 9,
wherein the testing device is further configured to determine, on the basis of the pressure measured by the pressure sensor during the functional tests, a sudden pressure change in the measured pressure attributable to the activation of the deflection device, and
wherein the testing device is further configured to perform at least one of:
a) determining a functional impairment of the pressure gauge when the pressure change deviates from a predetermined reference value by more than a predetermined tolerance, and/or,
b) on the basis of the difference between the pressure change and the reference value, to perform at least one of: to check a measuring accuracy of the pressure gauge, to output an impairment of the measuring accuracy when the absolute value of the difference exceeds a predetermined limit value, and to determine and output a degree of impairment of the measuring accuracy on the basis of the absolute value of the difference.

11. The pressure gauge according to claim 9,
wherein the deflection device is configured such that, when activated, it exerts a constant force deflecting the isolation diaphragm in a direction of a diaphragm bed of the isolation diaphragm,
wherein the testing device is further configured such that, on the basis of the pressure measured by means of the pressure sensor during the functional tests, it determines a pressure change in the measured pressure in the form of a pressure increase and attributable to the activation of the deflection device, and
wherein the testing device is configured in such a way that it:
outputs a reduced stiffness of the isolation diaphragm as a possible cause of a functional impairment if the pressure increase exceeds a limit value predetermined for this purpose,
outputs an increased stiffness of the isolation diaphragm as a possible cause of a functional impairment if the pressure increase falls below a limit value predetermined for this purpose,
outputs an increased pressure sensitivity of the pressure sensor and/or a reduced stiffness of a measuring diaphragm of the pressure sensor as a possible cause of a functional impairment if the pressure increase exceeds a limit value predetermined for this purpose, and
outputs a reduced compressibility of the pressure transmitting fluid as a possible cause of a functional impairment if the pressure increase falls below a limit value predetermined for this purpose.

12. The pressure gauge according to claim 9, wherein the testing device is further configured to compare a time curve of the pressure measured during the functional tests with a predetermined reference curve and, on the basis of the time curve, to derive at least one characteristic variable dependent on the time curve, compare the at least one characteristic variable with a predetermined reference value, and detect a functional impairment if the curve deviates from the reference curve by more than a predetermined extent or the at least one characteristic variable deviates from the reference value by more than a predetermined extent.

13. The pressure gauge according to claim 9,
wherein the deflection device is configured in such a way that, when activated, it exerts a constant force deflecting the isolation diaphragm in a direction of a diaphragm bed of the isolation diaphragm, and
wherein the testing device is further configured to detect and to output a leak of the pressure gauge when the measured pressure falls from a maximum pressure by more than a predetermined value during the period.

14. A method for testing a function of a pressure gauge, the method comprising:
providing the pressure gauge, the pressure gauge including:
a pressure sensor; and
a pressure transmitter connected upstream of the pressure sensor, the pressure transmitter including:
an isolation diaphragm under which a pressure receiving chamber is enclosed,
a hydraulic pressure transmission path connected to the pressure receiving chamber and filled with a pressure transmitting fluid, wherein the hydraulic pressure transmission path is embodied to transmit a pressure acting on an outer side of the isolation diaphragm to the pressure sensor, and an electronically activatable deflection device configured such that, when activated, the deflection device exerts a constant force on the isolation diaphragm or on an element connected to the isolation diaphragm to deflect the isolation diaphragm; and performing a functional test of the pressure gauge, wherein the functional test includes:

activating the deflection device for a predetermined time period;

measuring a pressure via the pressure sensor; and checking the function of the pressure gauge based on a sudden pressure change caused by the activation of the deflection device and measured during the functional test by means of the pressure sensor or based on a time curve of the pressure measured during the functional test by means of the pressure sensor.

15. The method according to claim 14, wherein the functional test further includes:

activating the deflection device to exert a constant force that deflects the isolation diaphragm in a direction of a diaphragm bed;

determining a pressure change in the measured pressure, which is in the form of a pressure increase and is attributable to the activation of the deflection device; and performing at least one of:

a) determining a reduced stiffness of the isolation diaphragm as a possible cause of a functional impairment when the pressure increase exceeds a limit value predetermined for this purpose;

b) determining an increased stiffness of the isolation diaphragm as a possible cause of a functional impairment when the pressure increase falls below a limit value predetermined for this purpose, c) determining an increased pressure sensitivity of the pressure sensor and/or a reduced stiffness of a measuring diaphragm of the pressure sensor as a possible cause of a functional impairment when the pressure increase exceeds a limit value predetermined for this purpose, and d) determining a reduced compressibility of the pressure transmitting fluid as a possible cause of a functional impairment when the pressure increase falls below a limit value predetermined for this purpose.

16. The method according to claim 14, wherein the functional test further includes:

activating the deflection device to exert a constant force that deflects the isolation diaphragm in a direction of a diaphragm bed; and detecting a leak in the pressure gauge when the measured pressure falls from a maximum pressure by more than a predetermined value during the period.

17. The pressure gauge according to claim 1, wherein:

the pressure sensor is a differential pressure sensor, upstream of which is connected a second pressure transmitter having an isolation diaphragm, an outer side of which is adapted to be supplied with a second pressure, and under which a pressure receiving chamber is enclosed, which is connected to a hydraulic pressure transmission path which is filled with a pressure transmitting fluid and transmits the second pressure acting on the outer side of the isolation diaphragm to the pressure sensor, the second pressure transmitter includes an electronically activatable deflection device which is configured in such a way that, when activated, it exerts a constant force deflecting the isolation diaphragm of the second pressure transmitter, on the isolation diaphragm or on an element connected to the isolation diaphragm, and the pressure gauge comprises a testing device which is configured to carry out functional tests of the pressure gauge, in which one of the two deflection devices is activated for the duration of a predetermined period in each case, and the testing device checks the pressure gauge on the basis of the differential pressure measured during the respective functional test by means of the pressure sensor, on the basis of a sudden pressure changes, attributable to the activation of the respective deflection device, in the differential pressure measured during the respective functional test by means of the pressure sensor, and/or on the basis of a time curve of the differential pressure measured during the respective functional test by means of the pressure sensor.

18. The pressure gauge according to claim 16, wherein the isolation diaphragms are magnetic or ferromagnetic or the elements connected to the isolation diaphragms are magnetic or ferromagnetic elements, wherein each deflection device includes an electronically activatable electromagnet which, when activated, exerts the force deflecting the isolation diaphragm, on the isolation diaphragm or on the element connected thereto, wherein the pressure gauge includes a deflection measuring circuit for each electromagnet which is connectable to or connected to the respective electromagnet and is configured such that it determines a deflection of the isolation diaphragm dependent on the pressure acting on the isolation diaphragm when the deflection device is deactivated, on the basis of a property of the electromagnet dependent on the deflection of the isolation diaphragm, on the basis of the inductance of the electromagnet, or on the basis of a variable dependent on the inductance of the electromagnet, and wherein the testing device is configured such that it checks the functioning and/or the measuring accuracy of the pressure gauge on the basis of the measured differential pressure and the difference between the deflections of the two isolation diaphragms measured by means of the two deflection measuring circuits, while both deflection devices are deactivated.

* * * * *